United States Patent [19]

Korsyn

[11] Patent Number: 4,497,755
[45] Date of Patent: Feb. 5, 1985

[54] METHOD FOR REPAIRING ARTICLES

[76] Inventor: Dever J. Korsyn, 904 69th Ave., Philadelphia, Pa. 19126

[21] Appl. No.: 413,264

[22] Filed: Aug. 31, 1982

[51] Int. Cl.³ .................. B29H 5/16; B29D 11/00
[52] U.S. Cl. ..................... 264/1.7; 264/1.9; 264/36; 425/11; 425/808
[58] Field of Search ............ 264/36, 1.1, 1.7, 1.9, 264/267; 425/11, 808, DIG. 36

[56] References Cited

U.S. PATENT DOCUMENTS

| | | | |
|---|---|---|---|
| 2,313,110 | 3/1943 | Wertz | 264/36 |
| 2,337,792 | 12/1943 | Yokell | 264/36 |
| 2,947,033 | 8/1960 | Ryan | 264/36 |
| 2,955,952 | 10/1960 | Herbst | 264/36 |
| 3,246,055 | 4/1966 | Pendleton | 264/36 |
| 3,562,366 | 2/1971 | Sohl | 264/36 |
| 3,697,630 | 10/1972 | Yoshino | 264/36 |
| 3,765,975 | 10/1973 | Hollingsworth | 264/36 |
| 3,804,685 | 4/1974 | Jacoby et al. | 264/36 |
| 3,814,645 | 6/1974 | Fletcher | 264/36 |
| 3,822,158 | 7/1974 | Hoffman et al. | 264/36 |
| 3,841,932 | 10/1974 | Forler et al. | 264/36 |
| 3,914,145 | 10/1975 | Forler et al. | 264/36 |
| 3,926,895 | 12/1975 | Britain | 264/36 |
| 3,988,400 | 10/1976 | Luhman | 264/36 |
| 3,993,520 | 11/1976 | Werner et al. | 264/36 |
| 4,032,272 | 6/1977 | Miller | 264/36 |
| 4,047,863 | 9/1977 | McCluskey et al. | 264/36 |
| 4,165,397 | 8/1979 | Ogden et al. | 264/36 |
| 4,200,478 | 4/1980 | Jacino et al. | 264/36 |
| 4,247,580 | 1/1981 | Chao | 264/36 |
| 4,273,598 | 6/1981 | Bowditch | 264/36 |
| 4,280,861 | 7/1981 | Schwartz | 264/36 |

FOREIGN PATENT DOCUMENTS 6615851 11/1966 Netherlands ............ 264/36

OTHER PUBLICATIONS

Epoxide Resins, W. G. Potter, Plastics Institute, 1970, pp. 210-216.

Primary Examiner—James Lowe
Assistant Examiner—V. Fischbach
Attorney, Agent, or Firm—Steele, Gould & Fried

[57] ABSTRACT

A method for repairing cracked and broken plastic articles such as lenses for automobile signal lights and the like comprises the steps of placing a form against a first surface of the plastic article such that the form covers the broken area, preparing an adhesive sealing compound which cures by exothermic reaction, applying the compound to the damaged areas of the lens from an opposite surface of the lens, heat generated by the exothermic reaction causing decreased viscosity of the compound and widening of cracks in the lens, the compound flowing into the widened cracks before curing, and removing the form after the compound has cured, whereby repaired portions of the lens diffuse light in a manner substantially indistinguishable from undamaged portions, and repaired portions are of comparable structural strength to the balance of the lens.

6 Claims, 10 Drawing Figures

METHOD FOR REPAIRING ARTICLES

BACKGROUND OF THE INVENTION

1. Field of the Invention

This invention relates to the repair of frangible items, and in particular to a cast-in-place repair of transparent and translucent items adapted to transmit diffused light, such as automobile lenses of the kind used over turn signal lights and brake lights, and commercial signs displayed to advertise businesses.

2. Description of Prior Art

Broken plastic articles have long been repaired by glueing the broken pieces together with a hardening, adhering compound. Normally this function is accomplished by applying glue to the edges of a broken area, matching the broken piece to the area from which it came, and then applying pressure. A broken lens can be thus repaired by building it up as a jigsaw puzzle, using the broken parts.

Unfortunately, many frangible items, including signal light lenses, are sufficiently brittle to shatter, but are also resilient such that stresses forming as the article is broken cause broken pieces to fly off. It is therefore usually the case that all the parts of the "jigsaw puzzle" are not available to be glued together. In addition, the plastic material of a sign or tail light is subject to deformation before breaking. Therefore, even if all the pieces can be found, they will not necessarily fit together again, because some may have been substantially deformed before and during breaking. A simple glue applied to directly join the broken pieces together is therefore inadequate.

In breaking, a plastic lens will exhibit a number of features. Pieces which are broken away or lost will leave holes, and chipped away depressions will remain on either or both of the inner and outer surfaces of the broken lens adjacent holes and cracks. Such chipped-out depressions are usually located at the junctions of cracks. The cracks radiate from a hole at the point of impact, or from some other nearby stress point, in a sunburst or spoked pattern.

The prior art has conceived of fixing articles having an open hole by filling the hole with a moldable material. With respect, for example, to rusted or dented automobile bodies, viscous moldable material is simply placed into the open hole or depression, and is allowed to cure and harden. The hole is usually overfilled, and after curing, the surface is sanded or otherwise treated as desired to approximate the undamaged contour. In filling a completely open void of substantial size, the material must be applied in stages, allowing previous stages to harden in order to support subsequent stages. The prior art alternatively employs screen-like material to bridge any substantial gap and prevent the moldable material from merely falling through the open hole which it is intended to close. Material falling through the hole is, of course, wasted. Material placed to extend past the undamaged contour is also wasted and must be removed without damaging and scratching adjacent undamaged areas. Wherever it is placed, filler material allowed to harden can be difficult to remove. In the enviroment of transparent or translucent lenses or covers, a screen or such hole-bridging member would prevent filler loss but is impractical in that it noticeably blocks light. Nevertheless, it is important to prevent the moldable hole-filling material from simply falling through the repaired hole.

The damage resulting from impact on a plastic lens such as an automobile tail light lens usually exceeds open holes exclusively. Cracks radiate from the point of impact, and chipping may occur on either or both of the inner and outer surface, usually adjacent the cracks. It is exceedingly difficult, if not impossible to adequately fill narrow cracks and chipped surfaces with the usual viscous moldable material. The moldable material is simply too thick to smoothly force into narrow spaces. In addition, as cracks, chips and surface checking may occur on either the inner or outer face, or both, the thick moldable material must be separately applied to each face, in order to fill in cracks.

In order to avoid the necessity of applying viscous moldable material to both an inner and outer surface of a broken article, the prior art has attempted to employ curable liquids, applied under pressure to cause the liquid to flow into all areas of the break. Heating apparatus have been used to generate elevated temperature and speed curing. A typical cosmetic repair is accomplished by applying curable liquid to a damaged automobile windshield using temperature and pressure. A cup-shaped body is placed over the damaged area in order to confine the pressure and presumably to urge the liquid compound into the damaged area.

The present invention employs a curable liquid resin which cures by exothermic chemical reaction, tending to open the cracks and facilitating flow of the resin along and into the cracks due to decreased viscosity caused by the increased temperature. Accordingly, an external source of pressure is not strictly necessary. The material is self-leveling and will seek the lowest level, flowing outward into any cracks where it is placed in uncured state. A casting form is employed to restrict flow past a certain surface, namely, that of the undamaged contour. The resin is preferably matched in color and light transmission properties to the plastic or other material to which it will be adhered, by suitable dyeing, whereby it will be indistinguishable from the balance of material.

When applied, the curable material of the invention is confined to the open areas of a broken article by means of a casting form coated with a release agent and placed on the flat external surface of the article. The casting form causes the material to cure in the desired external shape, and restricts flow. The material therefore flows outwards from a puddle on the form at the point of application, to fill the cracks, crevices and chipped areas. The invention provides a means of repairing broken articles such as plastic tail lights and the like, by which the repaired area is virtually indistinguishable from the remainder of the article.

SUMMARY OF THE INVENTION

It is an object of this invention to provide a kit and a method of repairing frangible transparent and translucent articles by which complete repair can be accomplished without need of special equipment of any kind.

It is another object of this invention to facilitate structural repair of articles such as sign panels and automobile indicator light lenses in a cosmetically indetectable manner.

It is yet another object of this invention to repair the bodies of broken lenses such that the light transmission properties of the repaired areas are indistinguishable from the properties of the unbroken areas.

It is yet another object of this invention to employ the exothermic reaction of curable epoxy sealing compound to improve flow, thereby filling remote parts of a cracked and broken lens.

It is yet another object to employ the heat generated by a central body of curable resin to speed curing in remote areas of a repair.

It is yet another object of this invention to preclude the need for expenditure of consumer resources on expensive repairs of common minor damage to automobiles.

These and other objects are accomplished by a kit and method for repairing a cracked and broken plastic article. The method comprises the steps of placing a casting form against a first surface of the plastic article, the casting form having a release agent on a face thereof covering the broken area, preparing an adhesive sealing compound having a curing agent to promote curing by exothermic reaction, applying the compound to the damaged areas of the plastic article from an opposite surface of the article, heat generated by the exothermic reaction reducing the viscosity of the compound and widening the cracks, the compound flowing into the widened cracks before curing, and, removing the casting form after the compound has cured, whereby repaired portions of the plastic article diffuse light in a manner substantially indistinguishable from undamaged portions and repaired portions are of strength comparable to the balance of the article. The kit includes uncured sealing compound dyed to a desired color, a curing agent, and means for mixing and applying the sealing compound.

BRIEF DESCRIPTION OF THE DRAWINGS

There are shown in the drawings the embodiments which are presently preferred. It should be understood, however, that the invention is not limited to the precise arrangements and instrumentalities depicted.

DESCRIPTION OF THE PREFERRED EMBODIMENTS

Figure 1:
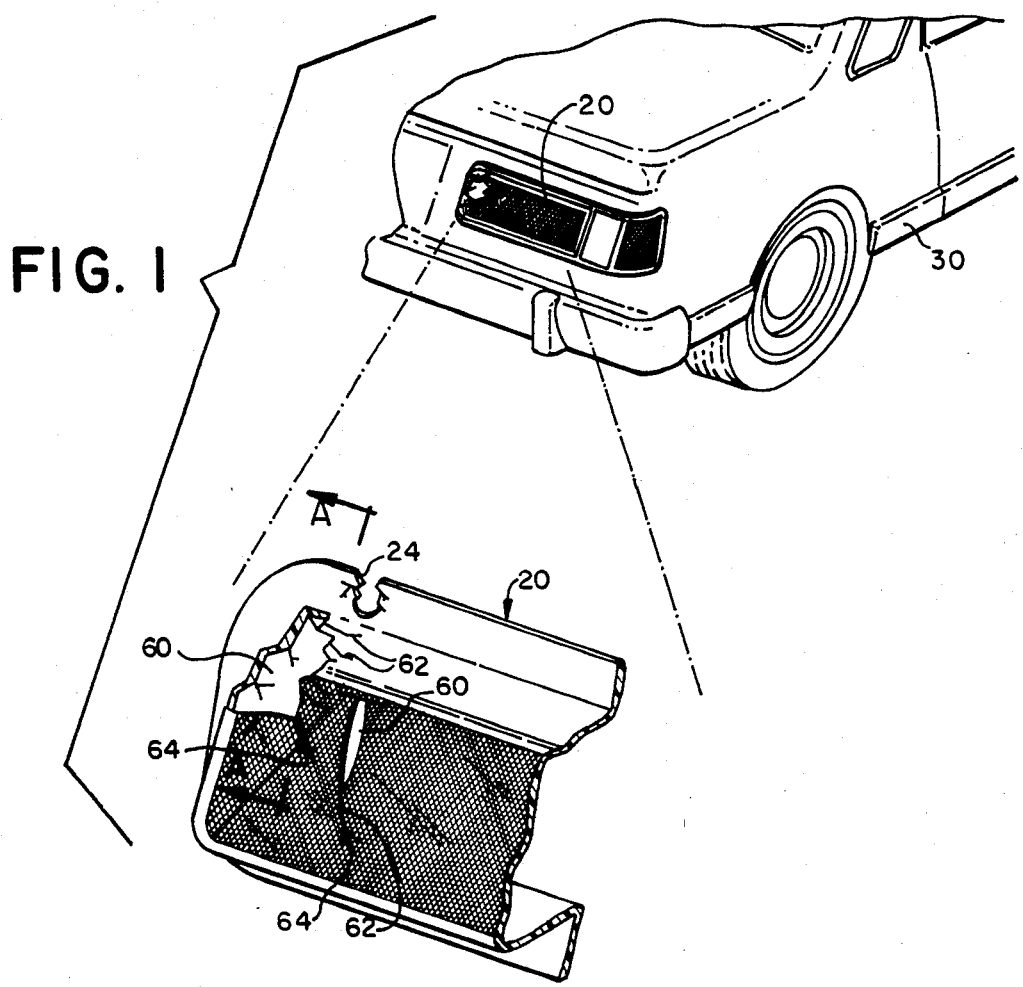
FIG. 1 is a perspective view of an automobile and broken tail light, the tail light shown enlarged and broken away.

In accordance with the present invention, a broken transparent or translucent article is repaired by filling the open holes, cracks and chips with a comparably dyed, curable liquid sealing compound held in place by a casting form coated with a release agent. The compound releases heat as it cures and the heat simultaneously widens the cracks, reduces viscosity and improves flow to fill all the gaps in the break. The casting form confines the liquid to the area missing from the broken article, a puddle resting in the break as it solidifies. Generated heat also speeds curing, after which the form is removed. Repair in such a manner precludes the necessity of finding all the broken pieces of the frangible article which pieces, in any event, may have been deformed to the extent that they can no longer be fit together in their original arrangement. FIG. 1 shows a typical broken indicator light, specifically a tail light. Like other common indicator lenses on an automobile, the lens is translucent plastic, dyed to a red, yellow or orange shade, and adapted to cover a bulb and to diffuse the light from the bulb over a wide angle. Such lenses are exceedingly expensive, sometimes quite large and even having multiple differently-colored portions cast monolithically.

Automobile 30 has been struck from the rear, or has backed into some obstruction such as a post bordering a parking lot. Indicator lens 20 has been crushed, broken and cracked. Part of the lens has fallen away from the break leaving open areas 60. While some of these broken pieces may have fallen into the area enclosed by the remainder of lens 20, some of the pieces fell to the ground at the time of the impact, and may be considered permanently lost.

The damage is not limited to the exact area of impact, at and adjacent holes 60. In addition, one of the lens mounting holes 24 has been broken as the lens was deformed during impact. A screw (not shown) upon which lens 20 was mounted and against which lens 20 was impelled during impact, has broken out an area 24 surrounding the screw hole.

Adjacent the primary hole at the area of impact, cracks 62 radiate in various directions. Cracks 62 correspond to the pattern of stresses and strains placed on the lens as it deformed and then broke. Cracks 62 may be of varying widths, but can be expected to be narrowest at their ends most remote from the area of impact, and broadest adjacent the holes 60. At various places in the pattern of cracks 62, chips 64 have been broken away from the body of lens material. Chips 64 may occur on either the outside or inside face of lens 20. Chips 64 are the result of cracks running through the body of the lens material at angles other than perpendicular to the body. It may be expected that cracks 62 are aligned in various directions, not always normal to the surface of the lens, and not always radiating directly away from the point of impact. Such cracks may even extend across the entire lens, dividing it into two or more pieces.

In order to repair broken lens 20, the objective is to replace the missing material in holes 60 with a material that adheres to the remainder of the lens. This replacement should preferably be of a material the same color and transparency or translucence as the remainder of lens 20. Should the user fill only the open voids with such material, light shining from an indicator light behind the lens would no longer appear contrastingly white through the holes 60. Light would still, however, shine directly through the cracks 62 and would show as visible white lines in the dyed lens. Light shining through chips 64 would also be noticeably lighter in contrast to light passing through the remainder of the lens. Such a repair would therefore be cosmetically unacceptable, and would cause the user to prefer a freshly-molded (i.e., brand new) indicator lens over a repaired one. This substantial expense is unnecessary.

In order to achieve the desired repair according to the invention, the user fills the voids using a curable material of sufficiently low viscosity to puddle and flow outwards from the point of application, filling the cracks and chipped areas. A low viscosity without some means of containment, however, will merely cause the sealing compound to flow through the damaged area and to drip away. It is therefore desirable to use a casting form to dam and hold the curable material in the area of damage. As shown in FIGS. 4–7, a complete repair can be effected in this manner.

Figure 4:
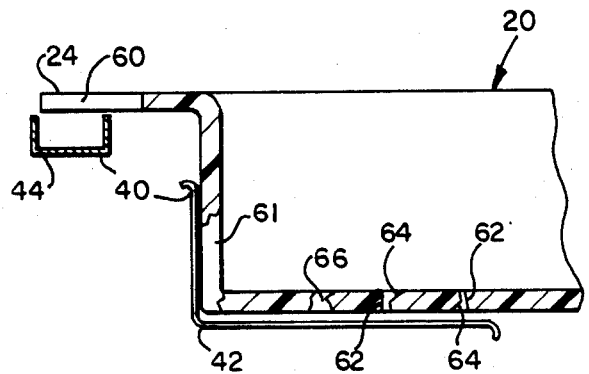
FIG. 4 is a section view taken along line A—A in FIG. 2, demonstrating the placement of a casting form.

FIG. 4 shows the placement of casting form 40. The form member 40 is placed over the external side of the broken lens, which is smooth. The form will confine the curable material and upon removal after curing, will determine the contour of the external face. A glossy tape produces a smooth surface contour on the repair. The form member may be as simple as one or more pieces of tape 42 covering the broken area as completely as possible and affixed to the lens body by an adhesive. Alternatively, the form material may be an actual casting mold 44 of appropriately shaped metal or the like, coated with a suitable release agent. Of course, the adhesive layer of adhesive-coated tape can itself constitute the release agent. It is presently preferred that tape bearing a pressure sensitive adhesive be used for a molding member where possible as it is cheap and effective.

The choice of material for the casting form depends in part on the character of the hole to be repaired. All of the choices include a glossy operative surface coated with a release agent to prevent a direct bond to the casting form. The same adhesive material which attaches the casting form to the lens preferably functions as the release agent. Alternatively, the operative face of the casting form may be greased with silicone. For a relatively larger repair, the preferred casting form is 7½ mil mylar tape having a pressure-sensitive acrylic adhesive on the glossy operative face. For relatively smaller areas, 3 mil polypropylene with an acrylic pressure-sensitive adhesive will suffice.

As shown in FIG. 4, form members 40 are placed over the damaged area on the smooth outer side. It will be appreciated that lens 20 has been removed from the automobile and turned such that the outer face is directed downward. Accordingly, the areas of the lens body having broken mounting hole 24 and the depicted areas of cracks 62 and chips 64, are horizontal. At least one hole 61, as shown in FIG. 4, is vertical. Any flowable sealing material placed in hole 61 will merely flow out along the horizontal inner surface of the lens.

Figure 5:
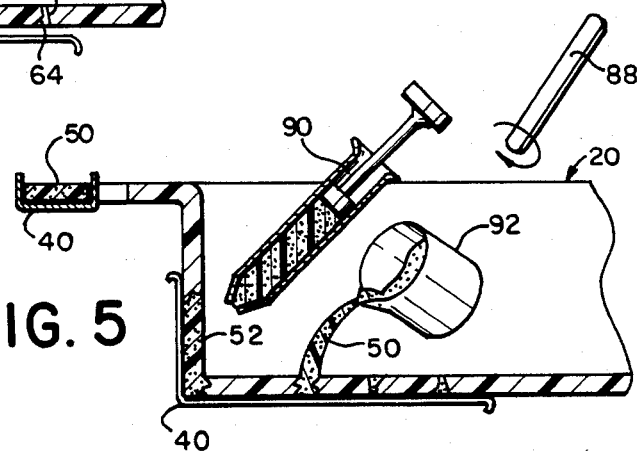
FIG. 5 is a section view taken along line A—A in FIG. 2, demonstrating the application of the sealing compound.

With reference to FIG. 5, repairs to the horizontal surfaces may be accomplished by merely pouring curable liquid sealing material 50 thereupon, for example after mixing the dyed epoxy resin and a curing agent via paddle 88, in beaker 92. The liquid sealing material is poured into the open area of hole 24, forming a puddle resting against the glossy surface of casting form 40 and bounded by the edges of the hole. The sealing material is also poured over and into all cracks 62 and chips 64, the cracks radiating from the hole in a sunburst pattern. Inasmuch as the sealing material is adapted to become less viscous at elevated temperatures, the heat of exothermic reaction, particularly that generated in the central hole region, causes the material to flow outward and downward into the narrow cracks. Vertical hole 61 may be subsequently repaired, first turning the lens to position hole 61 horizontally. Alternatively, the sealing material may be applied in the form of a gel 52, for example, by means of syringe 90.

Figure 6:
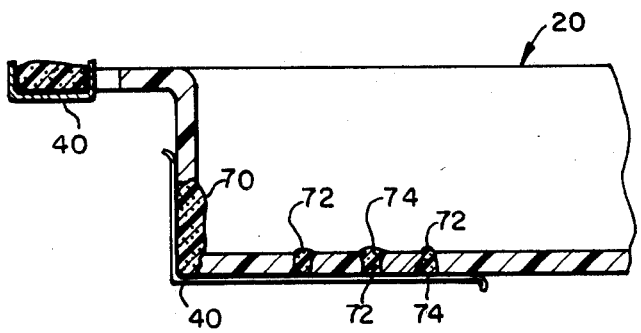
FIG. 6 is a section view taken along line A—A in FIG. 2, showing the applied compound.

The sealing material is cured by an exothermic reaction causing it to release heat and to harden. Before hardening becomes noticeable, the heat of the exothermic reaction causes a thinning effect which for a time, causes the sealing compound to flow along any open passageway such as a crack. As shown in FIG. 6, the sealing compound is filled inwardly and rests against the walls of the open areas and against the form. Since the form confines the material on the outer side, and any excess extends inwardly, the repair is not noticeable. The flow, and decreased viscosity, allow the sealing compound to assume a horizontal upper surface, i.e., defined by gravity. The heat of the exothermic reaction causes some thermal expansion, however, and forces the cracks to open slightly wider than was caused by the original damage. This further "damage" is inconsequential because the increased temperature caused by the exothermic reaction also simultaneously thins the sealing compound, whereby it flows easily along the narrowest cracks, and the cracks are filled substantially along their entire length, even as extended. The heat-generated reduction in viscosity is accompanied by a decrease in surface tension which together allow trapped air bubbles to escape, leaving a clear or translucent body of cast material.

Figure 3:
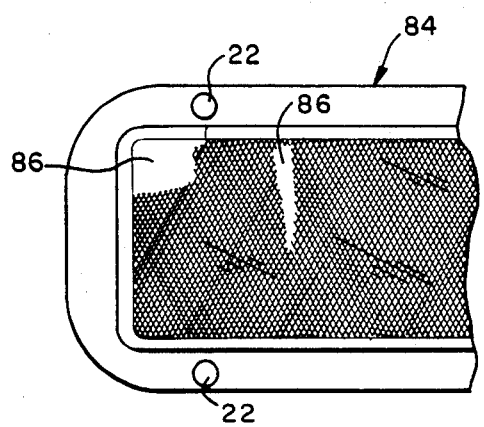
FIG. 3 is a partial elevation view of the tail light of FIG. 2, after being repaired in accordance with the invention.
Figure 7:
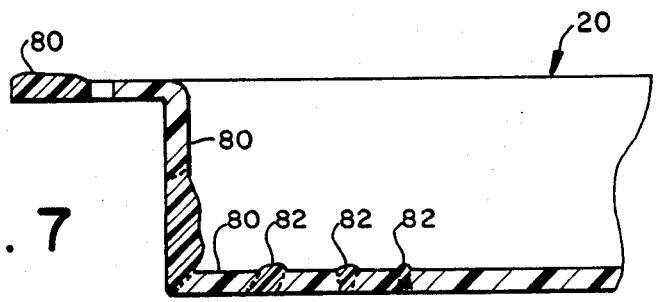
FIG. 7 is a section view taken along line A—A in FIG. 2, depicting the repaired lens.

Upon completion of curing, form members 40 are removed, leaving the finished product shown in FIGS. 3 and 7. The inner surfaces 80 of lens 20 are filled where the cracks, holes and chips formerly resided. Any excess material on the inside surface will not be visible from the outside. In any event, the reduced viscosity causes any substantial excess to flow horizontally outwards, seeking the lowest level. The external surface is smooth or otherwise contoured to match the surface of forms 40. Although the inner surface may be slightly irregular due to small amounts of excess filler, an observer sees only the smooth outer surface, and, as shown in FIG. 3, the repairs are indistinguishable from the balance of the lens.

Automobile lenses are often faceted on their inner surfaces. In the repaired area, the facets are missing, leaving variation 86 in the appearance of the repaired lens. A repair simulating facets can be accomplished by adding clear beads of glass or plastic to the dyed sealing compound.

Figure 10:
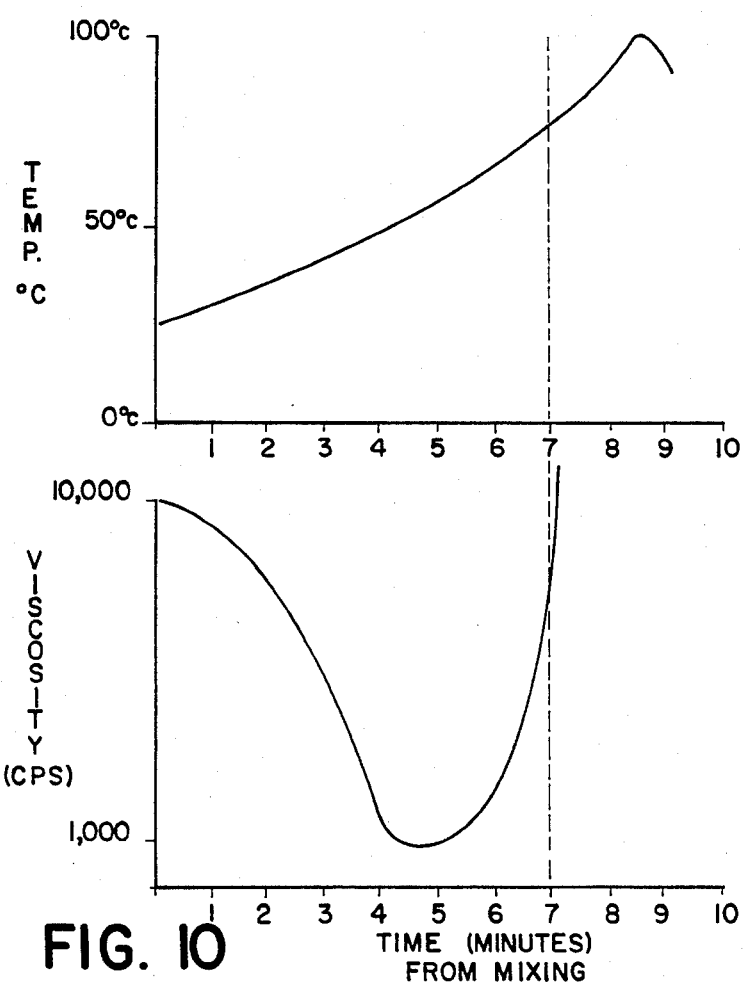
FIG. 10 is a dual graph showing the relationship of temperature and viscosity over time.

FIG. 10 illustrates the particular relationship of viscosity and temperature over time. Unlike many curable compounds, the epoxy material recommended generates substantial exothermic heat before any substantial hardening. Until hardening commences, the effect of the additional heat is a reduction in viscosity that lasts for a short period. Of course, hardening soon overtakes the reduced viscosity as the sealing compound cures. Moreover, the increased temperature generated in the chemical curing reaction itself accelerates curing.

Figure 2:
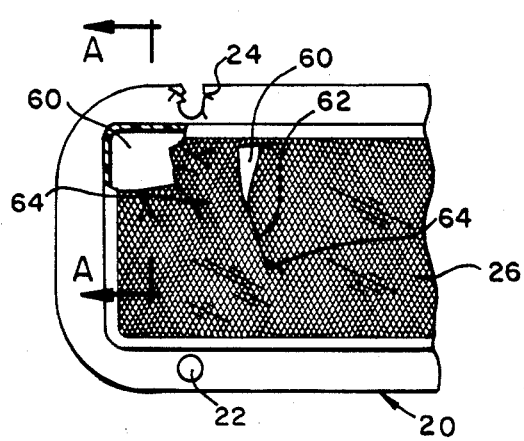
FIG. 2 is a partial elevation view of the tail light of FIG. 1.
Figure 8:
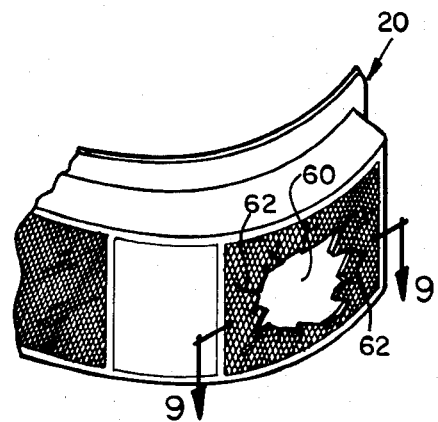
FIG. 8 is an elevation view of a portion of a curved lens having a break at the curve.

With reference to FIGS. 2 and 8, the exothermic heat generated by the epoxy as it cures is increased and compounded because the usual break in a lens or sign panel has a central hole and radiating cracks. Inasmuch as the central hole is filled with much more localized filler material than the cracks, the heat concentrated at the central hole. The greater heat causes accelerated curing. The mass of filler at the central hole therefore becomes quite hot and cures quite quickly. Heat conduction throughout the repair carries the heat outward into the radiating cracks such that the entire repair cures quickly. Although the exact temperatures and times vary based on the dimensions of the repair and the materials used, typical repairs will reach 180° F. (80° C.) and will virtually completely harden within 15 minutes of application. The fact that the break normally is sunburst-shaped allows the heat generated at the central hole to accelerate the cure of the entire quantity of filler, even though localized quantities of filler are much less at areas surrounding the central hole. Without the acceleration of curing due to added heat, for example if the repair were done in stages, the curing and hardening would take much longer.

Figure 9:
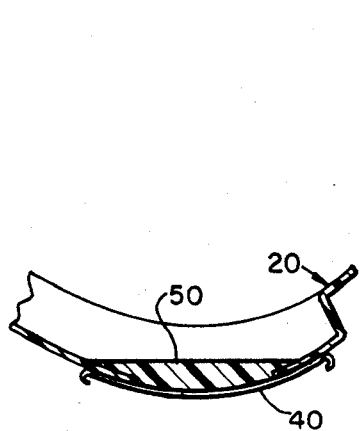
FIG. 9 is a section view along line 9—9 in FIG. 8.

As shown in FIGS. 8 and 9, the mass-sensitive heating effect will be particularly evident where a curved area is to be repaired. The filler material flows freely into a puddle due to the decrease in viscosity caused by exothermic heat prior to hardening or gelling. But for any capillary action, the filler seeks the lowest level, confined by the form. It is preferred that enough filler be employed that the lowest puddled level cover the entire break. As shown in FIG. 9, the puddle formed over a curved article is even more centrally-massive than a flat repair, and therefore will become even hotter and cure even more quickly.

Various sealing compounds are suitable for use in the present invention. In order to achieve complete structural repair, the compound must be essentially adhesive. It is presently preferred that clear, transparent epoxy sealing compounds be pigmented, dyed, tinted or otherwise colored to match the plastic lens. The lens may, of course, be clear or nearly clear, translucent, or varied. The plastic lenses are likely to be acrylic, polycarbonate or similar plastics. Suitable dyes for the epoxy sealing compound are known in the art and are used, in fact, to make the lenses.

The presently preferred epoxy sealing compound is bisphenol A/epichlorohydrin, such as that sold by Shell under the trademark EPON 828. Other comparable clear epoxy compounds are also applicable.

A curing agent is used to create exothermic heat as the epoxy resin cures, causing the sealing compound to thin and to flow easily along the cracks. It is preferred that an amine-based curing agent be employed. The curing agent may be an aliphatic or aromatic, or a polyamine as known in the art.

In situations where it is impossible to align the area to be repaired such that it is horizontal and situated above the form, a thixotropic agent may be added to the epoxy resin to make it gel-like. Suitable thixotropic agents are known in the art, for example that sold by the Cabot Corp under the trademark CAB-O-SIL. It will be appreciated that a thixotropic agent will cancel the thinning effect of exothermic heat.

The usual case will involve horizontal repair. In order to decrease viscosity further than that caused by exothermic heat, a suitable diluent may be added. The diluent will assist the flow of sealing material and the release of air bubbles, due to decreased viscosity and surface tension. A suitable diluent is butyl glycidol ether.

A kit including the necessary materials to effect the repair is conveniently kept as part of a user's normal stock of tools and supplies. The kit includes uncured, dyed epoxy sealing compound, a supply of tape for forms, a curing agent and means for mixing the epoxy and curing agent. Red and amber dyed epoxy will normally accommodate all the needed colors for automobile lenses. A full supply of colors will be required for signs generally. The form is preferably a supply of tape. A thixotropic agent may be included to gel the epoxy and/or a diluent to thin it, as desired.

Variations on the inventive concept are possible and will now become apparent to persons skilled in the art. Accordingly, reference should be made to the appended claims rather than the foregoing specification as indicating the true scope of the invention.

What is claimed is:

1. A method for repairing a broken plastic article adapted for diffuse light transmission, the article having a body broken to define an area having at least one open void through the article and cracks adjacent the void, the void and cracks to be filled and supported, the method comprising the steps of:

placing a form on a surface of the broken plastic article, the form covering a first side of said open void;

preparing an adhesive sealing compound having a dye for diffuse light transmission and a curing agent to promote curing by exothermic reaction, the adhesive sealing compound being a type that becomes thinner upon exothermic heating prior to gelation;

applying the sealing compound to the void from a side opposite the form, heat generated by the exothermic reaction thinning the compound and the compound expanding in the void and cracks, the thinned compound flowing freely into and filling the void and cracks; and, removing the form after the compound has cured whereby said area, filled by said dyed compound, diffuses light in a manner substantially indistinguishable from remaining portions of the article.

2. The method of claim 1, further comprising the step of aligning the broken area of said article horizontally before applying the sealing compound.

3. The method of claim 1, wherein said exothermic reaction is produced by addition of an amine-based curing agent to epoxy resin, the exothermic reaction commencing upon said addition.

4. The method of claim 1, wherein a thixotropic agent is added to at least a part of said sealing compound, whereby said compound becomes resistant to flow for initial application to at least one non-horizontal broken area.

5. The method of claim 1, wherein said form is a length of tape having a pressure sensitive adhesive on an operative surface thereof, the tape being dimensioned to cover one side of the broken area.

6. The method of claim 1, wherein said broken article is a plastic automobile tail light lens.

* * * * *